United States Patent [19]

Forster

[11] Patent Number: 5,000,291
[45] Date of Patent: Mar. 19, 1991

[54] LUBRICATION NOZZLE

[75] Inventor: Michael D. Forster, Johnstown, Ohio

[73] Assignee: Lubrimation, Inc., Columbus, Ohio

[21] Appl. No.: 416,056

[22] Filed: Oct. 2, 1989

[51] Int. Cl.[5] .......................................... F16N 13/16
[52] U.S. Cl. ..................................... 184/39; 184/7.4; 184/42; 251/357; 251/63.5; 239/533.13
[58] Field of Search .............. 184/7.4, 6.26, 39, 39.1, 184/41, 42, 45.1, 45.2, 55.1; 239/585, 533.13, 412; 251/360, 356, 357, 63.5; 222/394, 518, 504

[56] References Cited

U.S. PATENT DOCUMENTS

| | | | |
|---|---|---|---|
| 2,635,710 | 4/1953 | Tear | 184/7.4 |
| 2,647,017 | 7/1953 | Coulliette | 299/144 |
| 2,817,462 | 12/1957 | Lipinski | 184/7.4 |
| 3,084,718 | 4/1963 | Ash | 138/40 |
| 3,102,691 | 9/1963 | Gall | 239/456 |
| 3,236,256 | 2/1966 | Valentine | 251/356 |
| 3,236,496 | 2/1966 | Rosenstein et al. | 251/357 |
| 3,378,207 | 4/1968 | Huthsing, Jr. | 239/583 |
| 3,393,873 | 7/1968 | Larson | 239/533 |
| 3,715,013 | 2/1973 | Lyth et al. | 184/7.4 |
| 4,003,409 | 1/1977 | Steffens | 184/15.3 |
| 4,124,163 | 11/1978 | Siegmann | 239/533.15 |
| 4,315,616 | 2/1982 | Welker | 251/210 |
| 4,711,321 | 12/1987 | Hedlund | 184/7.4 |
| 4,720,076 | 1/1988 | Hyde | 251/122 |
| 4,721,289 | 1/1988 | Hennells | 251/63.4 |
| 4,785,996 | 11/1988 | Ziecker et al. | 239/412 |

OTHER PUBLICATIONS

Lubrimation, Inc., *Model 100 Nozzle*, 3 pages, prior to 1989 in the U.S.A.

Primary Examiner—Ira S. Lazarus
Assistant Examiner—Alan B. Cariaso
Attorney, Agent, or Firm—Marshall & Melhorn

[57] ABSTRACT

A lubrication nozzle has a body with a piston cavity formed therein. One end of the cavity is closed by an adjusting cap attached to a spring biased piston. The opposite end of the piston cavity has an orifice closed by a conical tip on the piston. Lubricating fluid and compressed air are supplied to separate ports in the body. The compressed air actuates the piston to open the orifice and permit the lubricating fluid to flow through a nozzle cap to an area to be lubricated. The tip and the seals on the piston are formed of an elastomeric material and easily can be replaced by removing the adjusting cap.

11 Claims, 1 Drawing Sheet

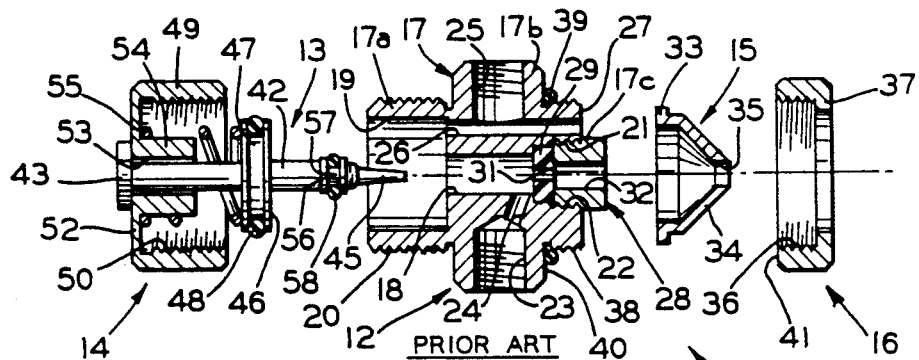
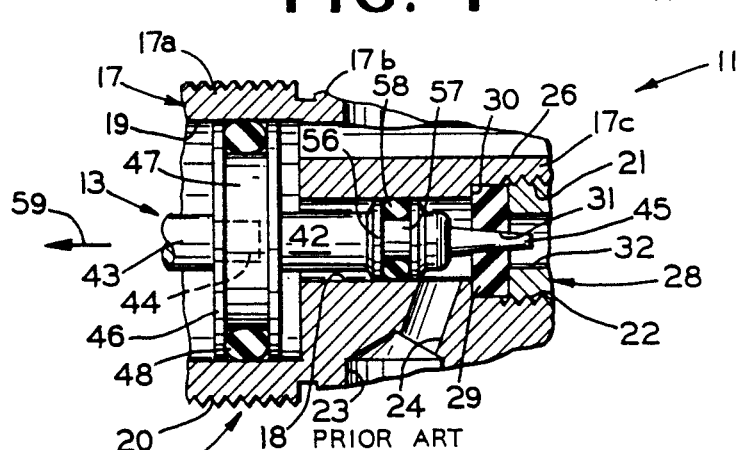
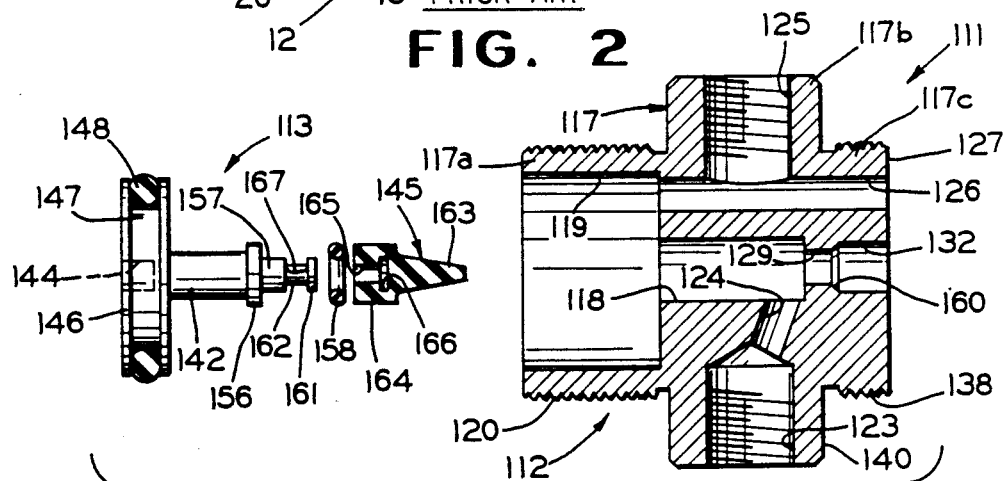
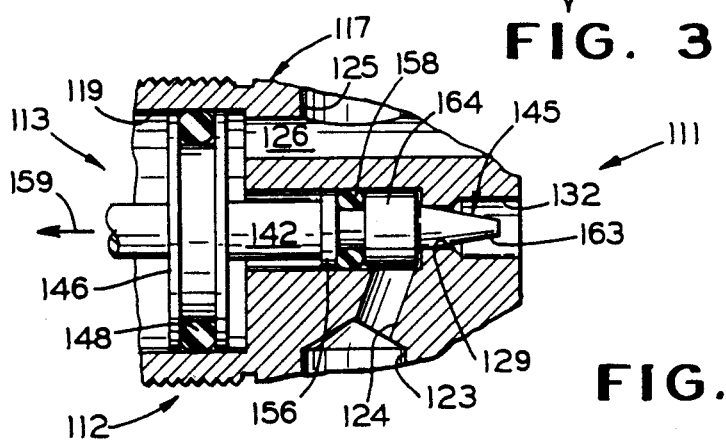

LUBRICATION NOZZLE

BACKGROUND OF THE INVENTION

The present invention relates generally to fluid control devices and, in particular, to a nozzle for dispensing lubricant to machine parts.

Nozzles are utilized in many applications to control the flow of pressured fluid from a source to desired locations. For example, in many continuous manufacturing operations, machines forming and processing products can not be stopped in order to make regular applications of required lubricants. Thus, it is desirable to provide a source of lubricating fluid under pressure, a nozzle attached to the machine for directing the fluid onto the areas to be lubricated and means for controlling the flow of fluid from the source to the nozzle.

A typical nozzle for applying lubricant to a machine includes a body having a cylindrical piston cavity formed therein which is open at both ends. A piston having a spaced apart pair of annular seals is inserted into the piston cavity from one end thereof and an adjusting cap is threaded onto the body to close that end. An elastomeric orifice is positioned at the other end of the cavity which is covered by a nozzle cap and threaded lock ring to form the nozzle opening. The piston is formed with a conical tip and is spring biased from the adjusting cap such that the tip closes a central opening in the orifice. A source of compressed air is connected to the piston cavity between the annular seals to move the piston and its conical tip away from the orifice opening. The pressured lubricant is then forced past the conical tip and through the orifice opening where it is directed to the machine areas to be lubricated by an opening in the nozzle cap.

One of the problems with the prior art lubrication nozzles is the difficulty of performing regular maintenance and repair. Each of these nozzles utilizes several elastomeric seals and an elastomeric orifice. These elastomeric elements are subject to wear and aging and must be replaced periodically. However, in order to replace these elements, the entire nozzle must be removed from the machine and disassembled. This requires removal of the adjusting cap, the piston assembly, the lock ring, the nozzle cap and the elastomeric orifice Thus, either the machine must be stopped or the nozzle replaced by a spare nozzle during the repair.

SUMMARY OF THE INVENTION

The present invention concerns a lubrication nozzle apparatus constructed to reduce repair time and frequency. The elastomeric orifice of the prior art nozzle is eliminated and an orifice formed in the nozzle body. The conical tip for closing the orifice is removed from the prior art piston body permitting easier replacement of the adjacent piston seal. An elastomeric conical tip is provided which is removably retained on the end of the piston body and also serves to retain the piston seal.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a cross sectional exploded side elevation view of a prior art lubrication nozzle;

FIG. 2 is an enlarged fragmentary cross sectional side elevational view of the piston and body of the nozzle shown in FIG. 1 assembled;

FIG. 3 is a cross sectional view similar to FIG. 1 showing a piston and body of a lubrication nozzle according to the present invention; and FIG. 4 is a view similar to FIG. 2 of the piston and body shown in FIG. 3 assembled.

DESCRIPTION OF THE PREFERRED EMBODIMENT

As shown in FIGS. 1 and 2, a prior art lubrication nozzle apparatus 11 includes a body assembly 12, a piston assembly 13, an adjusting cap 14, a nozzle cap 15 and a lock wing 16. The body assembly 12 has a generally cylindrical body 17 with one reduced diameter end portion 17a connected to a larger diameter central portion 17b which is connected to another reduced diameter end portion 17c. The central portion 17b has a generally cylindrical piston cavity 18 formed therein concentric with the longitudinal axis of the body 17. The piston cavity 18 has an enlarged diameter, generally cylindrical cylinder portion 19 formed at one end thereof generally coextensive with the end portion 17a which has threads 20 formed on the outer surface thereof. The end of the piston cavity 18 opposite the portion 19 is formed as a slightly enlarged diameter, generally cylindrical outlet portion 21 having internal threads 22 formed therein.

A radially extending, internally threaded lubrication inlet port 23 is formed in an outer annular surface of the central portion 17b of the body 17 and extends inwardly adjacent the piston cavity 18. The inner end of the inlet port 23 is in fluid communication with the piston cavity 18 via a passageway 24 formed therebetween through the body 17. The passageway 24 opens into the piston cavity 18 adjacent the outlet portion 21. Generally diametrically opposed to the inlet port 23 is an air inlet port 25 radially extending from the outer peripheral surface of the central portion 17b toward the piston cavity 18. An inner end of the air port 25 is in fluid communication with a second passageway 26 formed parallel to the longitudinal axis of the body 17 and spaced radially outwardly from the piston cavity 18. The passageway extends from the cylinder portion 19 to a radially extending end surface 27 of the end portion 17c.

The internal threads 22 formed in the wall of the outlet portion 21 threadably engage and retain an externally threaded cylindrical orifice retainer 28. An orifice 29 is retained between an inner end surface of the orifice retainer 28 and a generally radially extending step 30 formed at the junction of the piston cavity 18 and the outlet portion 21. The orifice 29 is typically made from an elastomeric material to enable it to seal against the step 30 and against the inner wall of the outer portion 21. A central aperture 31 is formed in the orifice 29 to permit the flow of lubricating fluid. For example, if a source of lubricating fluid under pressure is connected to the inlet port 23, such lubricating fluid will flow into the port 23, through the passageway 24 into the piston cavity 18, and will flow through the central aperture 31 as described in connection with FIG. 2 below. The orifice retainer 28 also has a central aperture 32 formed therein for directing the lubricating fluid from the aperture 31 into the nozzle cap 15.

The nozzle cap 15 is generally conical having a larger diameter flanged end 33 and a smaller diameter outlet end 34. The cap 15 has a lubricating fluid outlet aperture 35 formed in the smaller diameter outlet end 34. The larger diameter flanged end 33 is retained against the end surface 27 of the body 17 by the lock ring 16. The lock ring 16 has an annular shape with internal threads 36 formed therein. A radially inwardly extending flange 37 is formed at an outer end of the lock ring 16. The reduced diameter end portion 17c has external threads 38 formed thereon which engage the internal threads 36 of the lock ring 16. The diameter of the threads 38 is larger than the external diameter of the flanged end 33 and the internal diameter of the flange 37 is less than the external diameter of the flange 33. Thus, when the lock ring 16 is threaded onto the end portion 17c, the flanged end 33 of the nozzle cap 15 is retained between the flange 37 and the end surface 27 thereby enclosing the central aperture 32 formed in the orifice retainer 28.

Lubrication fluid flowing through the central aperture 32 enters the interior of the nozzle cap 15 and is forced through the aperture 35 and sprayed in a pattern determined by the shape and size of the aperture 35. For example, the aperture 35 will provide a conical spray pattern. A nozzle cap having a slot shaped opening will provide a fan shaped spray pattern. Other shapes will produce different spray patterns for use in dispensing all types of lubricating fluids including die release agents as is well known in the prior art.

In order to seal against leakage of the lubricant past the threads 36 and 38,. an "O" ring seal 39 is provided at the junction of the enlarged diameter central portion 17b and the reduced diameter end portion 17c of the body 17. The difference in diameters of the portions 17b and 17c forms an annular radially extending surface 40. When the lock ring 16 is threaded onto the end portion 17c, a generally radially extending end surface 41 of the lock ring 16 faces the surface 40 and the "O" ring 39 is sealingly trapped between the surfaces 40 and 41.

The piston assembly 13 and the adjusting cap 14 provide a means for manually adjusting the amount of lubricant applied through the nozzle apparatus 11. The piston assembly includes a piston body 42 which threadably retains a cap screw 43 in a longitudinally extending threaded aperture 44 formed in one end of the piston body. The opposite end of the piston body 42 has a truncated conical tip 45 formed thereon. An enlarged diameter piston 46, which is generally disk shaped and has an annular outwardly opening groove 47 formed therein, is formed at the one end of the piston body 42. The groove 47 retains an "O" ring seal 48 which extends outwardly from the groove 47 into sealing engagement with the inner walls of the cylinder portion 19.

The cap screw 43 extends through a cup shaped body 49 of the adjusting cap 14. The body 49 is internally threaded at 50 for threadably engaging external threads 20 formed on an outer surface of the reduced diameter end portion 17a of the body 17. The body 49 has a radially extending end wall 52 having a central aperture 53 formed thereon for receiving the shank of the cap screw 43. Extending inwardly from the edges of the central aperture 53 is a cylindrical guide wall 54. A spring means such as a helical spring 55 has an inner diameter slightly larger than the outer diameter of the guide wall 54. One end of the spring 55 extends over the guide wall 54 and abuts an inner surface of the end wall 52. The opposite end of the helical spring 55 abuts a facing surface of the piston 46. The head of the cap screw 43 is larger in diameter than the diameter of the central aperture 53 such that the helical spring 55 biases the head of the adjusting cap screw 43 against the outer surface of the end wall 52 and forces the piston body into the cylinder portion 19 and the piston cavity 18.

The conical tip 45 of the piston body 42 is positioned a fixed predetermined distance from the adjusting cap body 49 so as to be biased into engagement with and blocking the central aperture 31 of the orifice 29. As will be explained below, the force required to move the tip 45 away from the aperture 31 can be varied by rotating the adjusting cap 14 on the body 17. Located between the piston 46 and the conical tip 45 is a smaller diameter piston 56 of the piston body 42. The piston 56 has an annular outwardly opening groove 57 formed therein for retaining an "O" ring 58. The "O" ring 58 extends beyond the outer edge of the groove 57 to sealingly engage an inner wall of the piston cavity 18.

The prior art nozzle apparatus 11 shown in FIGS. 1 and 2 operates in the following manner. A source of lubricating fluid (not shown) is connected to the port 23. The source is typically under pressure or could be gravity fed. The source also could be continuous or turned on and off at regular intervals. The lubricating fluid flows from the source through the port 23 and the passageway 24 into the piston cavity 18 between the orifice 29 and the piston 56. The conical tip 45 extends through and seals the central aperture 31 thereby preventing the escape of the lubricating fluid from the piston cavity 18. Of course, the helical spring 55 will compress to prevent the conical tip 45 from being forced too far into the central aperture 31 thereby preventing damage to the orifice 29.

A pressured air source (not shown) is connected to the air port 25. The pressured air, acting through the passageway 26 on the different diameter pistons 46 and 56, will force the piston assembly 13 in the direction of an arrow 59 against the spring 55 and move the tip out of sealing engagement with the aperture 31. Lubricating fluid will flow through the central aperture 31 past the conical tip 45, through the central aperture 32 in the orifice retainer 28 into the interior of the nozzle cap 15 and through the aperture 35 to the selected location to be lubricated. The pressured air also flows through the passageway 26 into the interior of the nozzle cap 15 atomizing the lubricating fluid as it exits the aperture 35. The piston assembly 13 and, thus, the conical tip 45 move a predetermined distance related to the magnitude of the air pressure, the relative surface areas of the pistons 46 and 56, and the force exerted by the spring 55. This predetermined opening distance plus the adjustment available through the use of the adjusting cap 14 permits the selective control of the amount of lubricating fluid which will flow through the central aperture 31 in the orifice 29.

In order to service the various seals and the orifice in the nozzle apparatus 11, complete disassembly is required. The "O" rings 48 and 58 and the spring 55 can be removed only after the adjusting cap 14 together with the piston assembly 13 have been unthreaded from the end portion 17a of the nozzle apparatus body 17. The "O" ring 39 can be removed only after the lock ring 16 has been unthreaded from the end portion 17c of the body 17. The orifice 29 can be replaced only after the lock ring 16, the nozzle cap 15 and the orifice retainer 28 have been removed from the nozzle apparatus 11. Thus, it can be seen that complete servicing and replacement of the seals, the spring and the orifice require complete disassembly of the nozzle apparatus 11. In a continuous manufacturing operation, the nozzle assembly typically must be removed from the machine and replaced with another nozzle apparatus in order to perform the maintenance function. If no replacement nozzle apparatus is available, the entire manufacturing operation must be shut down in order to provide time to perform the maintenance function.

There are shown in FIGS. 3 and 4, portions of a nozzle apparatus 111 in accordance with the present invention. In FIG. 3, a body assembly 112 and a piston means or assembly 113 are shown in an exploded cross sectional view. The assemblies 112 and 113 can be utilized with the adjusting cap 14, the nozzle cap 15 and the lock ring 16 of the prior art nozzle apparatus 11 shown in FIGS. 1 and 2.

The body assembly 112 includes a body 117 having a first reduced diameter end portion 117a with external threads 120 for threadably coupling to the adjusting cap 14. The body 117 also has an enlarged diameter central portion 117b which includes a lubricating fluid inlet port 123 and a diametrically opposed pressured air inlet port 125. The ports 123 and 125 are similar to the ports 23 and 25 in the prior art and are connected respectively to passageways 124 and 126 which are similar to the passageways 24 and 26 of the prior art device. The body 117 also has a reduced diameter opposite end portion 117c which has external threads 138 formed thereon for threadably engaging the lock ring 16. As in the prior art device, the lock ring 16 seals against the "O" ring 39 which in turn seals against a radially extending surface 140 between the body portions 117b and 117c. A radially extending annular surface 127 at the outer end of the end portion 117c is adapted to abut the flanged end 33 of the nozzle cap 15.

The prior art orifice 29 has been replaced by a reduced diameter orifice 129 formed in the body 117. The orifice 129 is connected at one end to the piston cavity portion 118 and is connected at an opposite end to a central aperture 132 by a tapered transition section 160. The central aperture 132 is similar to the central aperture 32 in the prior art orifice retainer 28 which retainer has been eliminated. The opposite end of the piston cavity 118 is connected to an enlarged diameter cylinder portion 119. The cylinder portion 119, the piston cavity 118, the orifice 129, the transition taper 160 and the central aperture 132 are formed generally concentric with the longitudinal axis of the body 117.

The piston assembly 113 includes a piston body 142 having a threaded aperture 144 formed in one end thereof for receiving the threaded end of the adjusting cap screw 43 shown in FIG. 1. Also formed at this end of the piston body 142 is a piston 146 having an annular radially outwardly opening groove 147 formed in the periphery thereof. The groove 147 retains an "O" ring 148 for sealing against the internal walls of the cylinder portion 119 as shown in FIG. 4.

The opposite end of the piston body 142 has two reduced diameter portions 157 and 161 separated by an annular radially outwardly opening groove 162. The reduced diameter portion 161 is formed at the end of the piston body 142 and the similar diameter portion 157 is formed on the opposite side of the groove 162 adjacent an enlarged diameter piston portion 156. An "O" ring 158 easily can be installed over the portion 161 and the groove 162 onto the portion 157 to abut the piston 156. The "O" ring 158 is slightly larger in outside diameter than the piston 156 to sealingly engage the walls of the piston cavity 118 as shown in FIG. 4.

The groove 162 and the reduced diameter portion 161 are utilized to retain a conical piston tip 145. The tip 145 is formed of an elastomeric material and has a truncated conical end portion 163 which closes the orifice 129 to prevent the flow of lubricating fluid through orifice to the central aperture 132. The piston tip 145 cooperates with the enlarged portion 156 to retain the "O" ring 158. As in the prior art nozzle apparatus 11, when pressured fluid such as compressed air is applied at the port 125, the piston assembly 113 is forced in the direction of an arrow 159 to a second predetermined position provide an opening of predetermined area through which the lubricating fluid can flow from the port 123 to the central aperture 132.

The conical piston tip 145 also includes an enlarged diameter cylindrical body portion 164 at the end of the body portion 164 opposite the tip 163. Formed in the body 164 is a central aperture 165 which is connected to a larger diameter cavity 166. The cavity 166 has a diameter approximately equal to the diameter of the portion 161 of the piston body 142. The central aperture 165 has a diameter approximately equal to the diameter of the groove 162. Since the conical piston tip 145 is formed of an elastomeric material, the central aperture 165 can be expanded and forced past the reduced diameter portion 161 of the piston body 142. Once the reduced diameter portion 161 enters the larger diameter cavity 166, the central aperture 165 springs back to shape in the groove 162. Thus, the conical piston tip 145 is securely retained on the end of the piston body 142. A coating of adhesive 167 can be applied to the outer surface of the groove 162 for firmly attaching the conical piston tip 145 to the piston body 142. The piston tip 145 can be formed of any suitable elastomeric material resistant to lubricating fluids such as a seventy durometer VITON material.

The "O" rings 148 and 158 and the conical piston tip 145 are constantly being subjected to wear as the piston assembly 113 is moved back and forth by the alternate application of compressed air and the return spring 55. Thus, these three elements wear more rapidly than the other elements in the nozzle apparatus 111. In order to replace these elements, the adjusting cap 114 is simply unscrewed from the reduced diameter end portion 117a thereby exposing the "O" rings 148 and 158 and the tip 145. Once the tip 145 has been removed, the "O" ring 158 can easily be removed in an operation that is simpler than attempting to replace the "O" ring 58 of the device shown in FIGS. 1 and 2. Since the "O" ring 39 is not subjected to wear, it does not need to be replaced as often. Thus, the removal of the lock ring 16 is still required to service the "O" ring 39.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A nozzle apparatus for selectively dispensing lubricating fluid comprising:
    a nozzle body having a piston cavity with an orifice at one end formed therein;
    piston means movable in said cavity, said piston means including an enlarged diameter portion formed adjacent a reduced diameter portion on said piston means and a removable seal for sealingly engaging an internal wall of said cavity;

spring means biasing said piston means to a first predetermined position in said cavity; and a piston tip removably attached to said piston means for closing said orifice in said first predetermined position, whereby said piston tip and said enlarged diameter portion retain said removable seal for sealingly engaging the internal wall of said cavity.

2. The nozzle apparatus according to claim 1 wherein said piston tip is formed of an elastomeric material.

3. The nozzle apparatus according to claim 2 wherein said piston tip is formed of a material having a durometer of approximately seventy.

4. The nozzle apparatus according to claim 1 wherein said enlarged diameter portion being positioned between opposite ends of a piston body of said piston means.

5. The nozzle apparatus according to claim 1 wherein said removable seal is an "O" ring.

6. The nozzle apparatus according to claim 4 wherein said piston mean includes another piston formed on said piston body at an end opposite said piston tip, said another piston including a removable "O" ring seal thereon for sealingly engaging an enlarged diameter cylinder portion formed in said nozzle body.

7. The nozzle apparatus according to claim 1 including means for removing said piston means from said nozzle body whereby said piston tip can be removed from said piston means.

8. The nozzle apparatus according to claim 7 wherein said piston means includes a pair of removable "O" ring seals for sealingly engaging internal walls of said cavity.

9. A nozzle apparatus for selectively dispensing lubricating fluid comprising:

a nozzle body having a piston cavity, an orifice, a lubricating fluid inlet port and a compressed air inlet port formed therein;

a piston body movable in said piston cavity and having sealing means for sealingly engaging an interior wall of said piston cavity, said orifice and said lubricating fluid inlet port being in fluid communication with said piston cavity on one side of said sealing means and said compressed air inlet port being in fluid communication with said piston body;

an adjusting cap releasably attached to said nozzle body;

spring means positioned between said piston body and said adjusting cap for biasing said piston body to a first predetermined position in said piston cavity; and a piston tip removably attached to said piston body for closing said orifice in said first predetermined position thereby preventing lubricating fluid flow from said lubricating fluid inlet port through said orifice whereby when compressed air is applied to said compressed air inlet port, said piston body moves to a second predetermined position to permit lubricating fluid flow through said orifice.

10. The nozzle apparatus according to claim 9 wherein said piston tip is formed of an elastomeric material.

11. A nozzle apparatus for dispensing lubricating fluid comprising:

a nozzle body having a cavity, an orifice, a lubricating fluid inlet port and a compressed fluid inlet port formed therein, said cavity having a piston cavity portion and a larger diameter cylinder portion, said orifice and said lubricating fluid inlet port being in fluid communication with said piston cavity portion and said compressed fluid inlet port being in fluid communication with said cylinder portion;

a piston body having a larger diameter piston formed at one end thereof and a smaller diameter piston formed intermediate the ends thereof, said larger diameter piston including a removable "O" ring for sealingly engaging an interior wall of said cylinder portion and said smaller diameter piston including a removable "O" ring for sealingly engaging an interior wall of said piston cavity portion;

an adjusting cap removably attached to said nozzle body and to said piston body;

spring means positioned between said adjusting cap and said larger diameter piston for biasing said piston body to a first predetermined position; and an elastomeric piston tip removably attached to said piston body for engaging said orifice in said first predetermined position to prevent lubricating fluid flow from said lubricating fluid inlet port through said orifice whereby when compressed fluid is supplied to said compressed fluid inlet port, said piston tip is moved to a second predetermined position to permit lubricating fluid to flow through said orifice.

* * * * *